Dec. 29, 1959     C. M. BLACKBURN     2,919,160
APPARATUS FOR DISPENSING MATERIAL
Filed Oct. 25, 1957
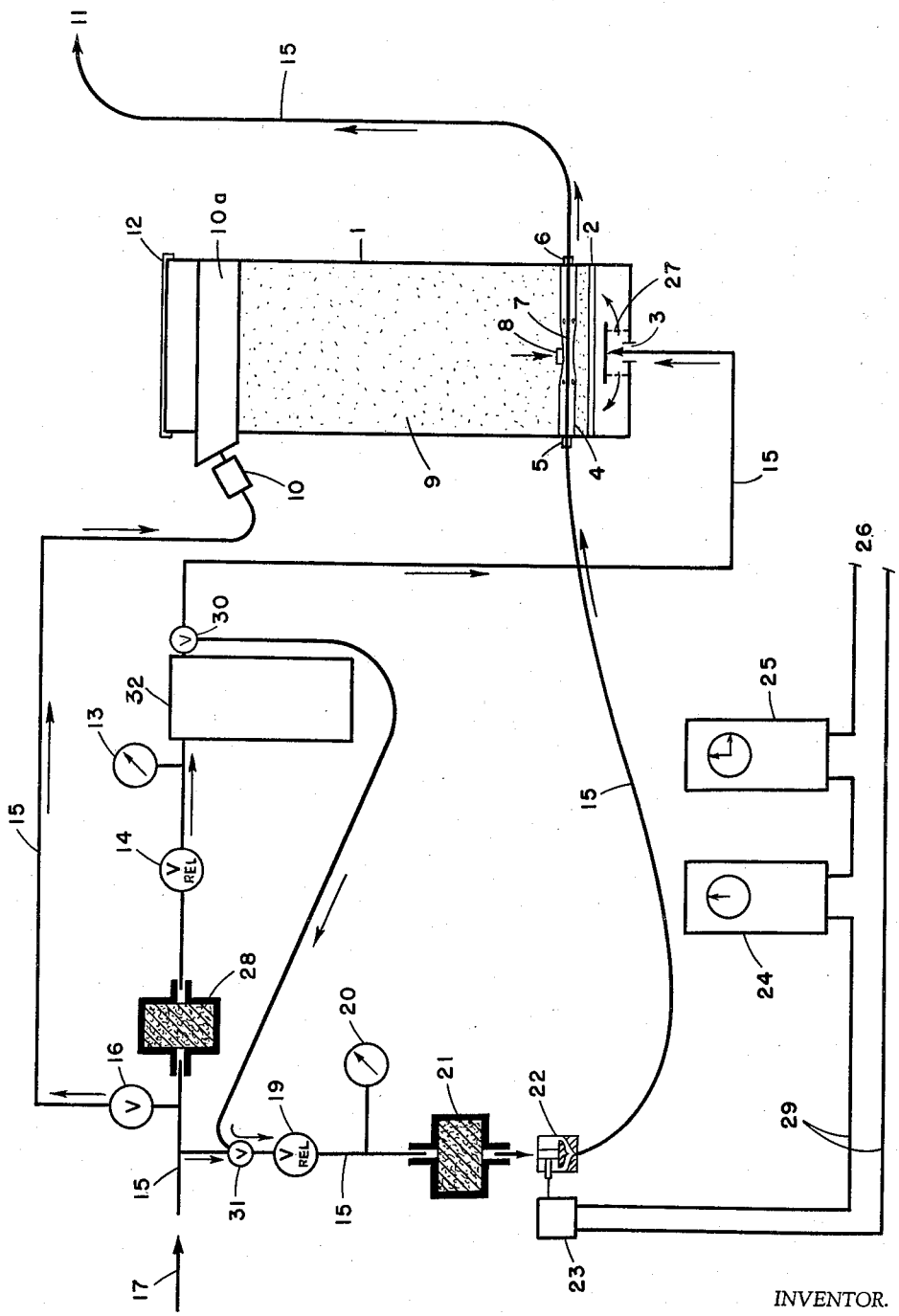
INVENTOR.
CHARLES M. BLACKBURN
BY James T. Dunn
ATTORNEY United States Patent Office 2,919,160
Patented Dec. 29, 1959

2,919,160

APPARATUS FOR DISPENSING MATERIAL

Charles Melvern Blackburn, Wallingford, Conn., assignor to American Cyanamid Company, New York, N.Y., a corporation of Maine Application October 25, 1957, Serial No. 692,417

2 Claims. (Cl. 302—57)

This invention relates to an apparatus for dispensing powdery materials, and more particularly, this invention relates to an apparatus for dispensing powdery materials comprising a housing or aeration chamber equipped with a foraminous membrane located in the lower portion of the chamber and which is used to support the pulverulent material and to keep it separated from the air stream which is introduced into the base of the chamber and through which the air streams flow into the pulverulent material. This aeration chamber also has built therein a tube with an inlet connection and an outlet connection on opposite sides of the chamber and running in a substantially horizontal orientation containing an open-throated venturi tube which opening is facing toward the upper portion of the chamber. The air which is used to carry the powdery material to its place of deposition is passed through this tube and it engages the powdery mass through the open-throated venturi and the powdery material is carried along in this conduit to the place where it is to be deposited. The air passing through this tube may be in constant stream or may be sent through in spurts at fixed times, whereby controlled amounts of the powdery material is taken out when and as desired. The chamber is equipped additionally with a vibrating member or means which in the course of operation prevents the air channeling from taking place within the mass of powdery material contained in the aeration chamber.

One of the objects of the present invention is to produce a piece of apparatus which can be used to dispense powdery materials in the form of a fog-like cloud of powder in air. A further object of the present invention is to produce an apparatus which can be used to dispense finely divided solid materials in precise quantities and at selected intervals of time without incurring the risk of clogging the tubing through which the powdery material is directed to its ultimate point of deposit. These and other objects of the present invention will be discussed in greater detail hereinbelow.

The concept of the present invention will be more completely understood by making reference to the accompanying drawing in which 1 is the aeration chamber or housing which is used to contain the powdery material and may be of any configuration in horizontal cross section such as oblong, square, or circular. The cylindrical type of chamber is preferred. Toward the bottom of the aeration chamber there is a foraminous membrane 2 which is oriented in a substantially horizontal position situated within the aeration chamber near the base thereof but above said base. This foraminous membrane may be a perforated metallic sheet or a fabric such as duck cloth. The foraminous membrane is substantially coincident in size with the cross section of the aeration chamber at its point of location. The air intake aperture 3 is located below the foraminous membrane and near the base of said aeration chamber. In a cylindrical housing the air intake aperture 3 could be centered in the base of the housing. A baffle plate 27 constructed within the aeration chamber and immediately about the air intake aperture but below the foraminous membrane may be set up. This will permit the air coming in through the aperture 3 to be distributed more widely and permit the air to be driven around the baffle 27 and through the foraminous membrane 2. The top of the aeration chamber 1 is open to the atmosphere in the sense that it is not airtight although it may have a comparatively loose-fitting lid 12. The purpose for the lid is to keep the powdery material being aerated in the chamber from escaping into the room in which the apparatus is set up and yet is not designed to be airtight inasmuch as the air entering the chamber through the aperture 3 should be permitted upon aerating the powdery material to escape to the open atmosphere. The vibrator 10 is attached to the vibrator mount 10a which is a steel band or the like secured to the aeration chamber. The vibrator 10 is activated by air pumped from the outside atmosphere at 17 through the valve 16 and the tube 15 to the vibrator. The tube 15 may be any conventionally available material such as metal tubing, rubber tubing, or plastic tubing such as those prepared by using polyethylene and the like. The flexible tubing is preferred. The tube 4 running from one side of the aeration chamber 1 to the other is equipped with an intake connection 5 and an outlet 6. This tubing is preferably metallic. In the approximate center of said tubing 4, there is located a venturi tube 7 mounted on the tube 4. The aperture 8 on the venturi tubing faces upwardly and as the air passes through the inlet valve 5 through the constriction of the venturi tube 7 the powdery material is drawn down into the air stream in a fog-like mist and out of the outlet valve 6 and along the tubing 15 to the point of deposition 11. Throughout the entire system the tubing is uniformly referred to as 15 and all that has been said hereinabove with respect to the tubing conveying the air to the vibrator 10 is equally applicable in all of the other applications. It is particularly desirable that the tubing extending from the outlet connection 6 to the point of deposition 11 be of a very smooth material such as rubber tubing, plastic tubing, or copper tubing, inasmuch as sharp corners should be avoided so as to permit the constant, even flow of the foggy mass of powdery material dispersed in air to flow therethrough without constriction. The air for the intake valve 3 originates from the point 17 an outside source of air, namely atmospheric air, which air is forced under pressure through the tube 15 into the filter 28. The filter 28 serves the purpose of taking out of the atmospheric air any dust, oil, or other solid impurities that may be present in the atmospheric air prior to its use in the system. When the air has left the filter 28, it goes through the pressure reducing control valve 14 into the drier 32. Gage 13 shows reduced pressure values. The drier 32 serves the purpose of removing from the purified air any particles of moisture present in the air so that when introduced into the aeration chamber 1, there will be no caking of the powdery material due to the presence of moisture. When in full operation, the air that has been dried in the drier 32 is passed through the conduit 15 into the intake 3 and from there into the aeration chamber. The air entering the inlet 3 is generally passed through at a constant rate into the aeration chamber 1 at a force sufficient to maintain the powdery material 9 in a substantially aerated condition within the chamber while the vibrator 10 serves to prevent the formation of channeling in the powdery mass 9 which channeling would result in a diminished degree of aeration of the powdery material in the chamber. The air introduced into the tube 4 through the intake connection 5 originates at the same outside source as before at 17, and may go directly through 19 or may travel as before to a point 30 beyond drier 32 for a preliminary purification where it separates from the aeration air and passes through the valve 31 to reducing control valve 19 through the tube 15 into the filter 21 which serves the same purpose as the filter 28 on the other stream, namely to remove solid impurities from the air such as dust, oil, and the like. The valve 31 can be adjusted so as to take atmospheric air directly from 17, or purified atmospheric air from 30 to the reducing control valve 19. The gauge 20 indicates the air pressure on the line 15. After passing through the filter 21, the air passes through the valve 22, which is electrically activated by the solenoid 23, which is connected by conventional electrical couplings with the wires 29 originating from the source 26 and passing through the quantity control box 25 which serves to control the amount of air in the spurts and the injection timer 24, which is the time control of the air spurts. If it is desired to pass the air from the outside source through the filter 21 and through the tube 4 without interruption, the solenoid valve 22 can be by-passed, and in that event, there is no need for the solenoid valve controls 23, 24, and 25.

The apparatus of the present invention will have application in the field of conveying from one location to another powdery materials of all descriptions such as flour, talcum, Portland cement, finely divided resinous materials, such as the urea formaldehyde resin powders, the melamine formaldehyde resin powders, or lubricants frequently used with the synthetic resin powders such as zinc stearate in a micropulverized state and the like.

The use of the air in spurts to deposit the powdery material in controlled amounts and at fixed intervals of time will have application in a certain particular class of operations such as in the depositing of a mold lubricant such as zinc stearate on a resinous material such as a melamine formaldehyde molding composition containing filler in which the mold lubricant, zinc stearate, is introduced into a rotating chamber containing the melamine formaldehyde resin and filler in intimate admixture and said mixture being coated at regular intervals with the dry mist of mold lubricant. By using the apparatus in this way, the mold lubricant is evenly deposited on the resin impregnated filler particles and leads to greater uniformity of deposition of the lubricant on said particles and further results in a substantial saving in finding the maximum usage out of the minimum amount of lubricant. The air spurts carrying the mold lubricant may be adjusted so as to carry from 1–24 grams every minute. Other variations of amounts and time intervals may be achieved by the appropriate adjustments of the controls 24 and 25.

What is claimed is:

1. An apparatus for dispersing powdery materials comprising a housing for pulverulent material with a foraminous membrane oriented in a substantially horizontal position situated within said housing, near but above the base thereof, the top of said housing being open to atmospheric pressure, an air intake aperture located below said membrane and near the base of said housing through which air can be passed into said housing in a substantially steady stream, a tube with an intake connection and outlet connection located in the lower portion of said housing but above said membrane, said tube running substantially laterally with respect to said housing, said tube equipped with an open-throated venturi tube with the opening therein facing upwardly, a means attached to said housing adapted to vibrate the housing sufficiently to prevent air channeling in the mass of powdery material contained in said housing, means attached to said intake connection to permit the introduction of air whereby the pulverulent material is passed from said housing to its place of deposition.

2. An apparatus for dispersing powdery materials comprising a housing for pulverulent material with a foraminous membrane oriented in a substantially horizontal position situated within said housing, near but above the base thereof, the top of said housing being open to atmospheric pressure, an air intake aperture located below said membrane and near the base of said housing through which air can be passed into said housing in a substantially steady stream, a tube with an intake connection and outlet connection located in the lower portion of said housing but above said membrane, said tube running laterally with respect to said housing, said tube equipped with an open-throated venturi tube with the opening therein facing upwardly, a means attached to said housing adapted to vibrate the housing sufficiently to prevent air channeling in the mass of powdery material contained in said housing, means attached to said intake connection to permit the introduction of air in spurts whereby the pulverulent material is passed in controlled amounts at fixed intervals of time from said aeration chamber to its place of deposition.

References Cited in the file of this patent
UNITED STATES PATENTS

| | | |
|---|---|---|
| 1,616,547 | Pontoppidan | Feb. 8, 1927 |
| 2,120,003 | Schanz | June 7, 1938 |
| 2,164,483 | Watson | July 4, 1939 |
| 2,758,564 | Randall | Aug. 14, 1956 |